United States Patent Office 2,700,690
Patented Jan. 25, 1955

2,700,690

REMOVAL OF SAPONIFIABLE SULFUR COMPOUNDS FROM HYDROCARBONS

Henry O. Mottern, Bloomfield, N. J., assignor to Standard Oil Development Company, a corporation of Delaware No Drawing. Application March 20, 1951,
Serial No. 216,659

7 Claims. (Cl. 260—676)

This invention is concerned with the removal of saponifiable sulfur compounds, for example, sulfuric acid esters, sulfonic acids, and substituted sulfonic acids from hydrocarbons containing the same. The invention is particularly applicable to the removal of such compounds from petroleum naphthas. The saponifiable sulfur compounds are removed from the hydrocarbons by passage of the mixture over activated carbons deposited on a support such as silica gel, alumina, clay, etc.

The sulfuric acid treatment of naphthas is well known in the petroleum refining art. In the preparation of aliphatic alcohols hydrocarbon streams containing olefins are treated with sulfuric acid of 65% strength or higher. Countercurrent extraction of olefins from hydrocarbon solutions with sulfuric acid forms acid extracts containing dialkyl sulfates, alkyl acid sulfates, sulfonic acids, free alcohol and other oxygenated compounds and sulfuric acid. The dialkyl sulfates and to some extent the sulfonic acids are the only materials which show sufficient solubility to reach an equilibrium distribution between the acid and hydrocarbon phases. The distribution of the dialkyl sulfates between the acid and hydrocarbon layers is related to the mol ratio of olefin absorbed, to the $H_2SO_4$ in the acid extract (extract saturation) and also the acid strength. Those acid extracts which have been saturated to 0.1 to 0.5 moles olefin/mol acid have less dialkyl sulfate present for solution in the hydrocarbon phase than extracts having .5 to 2.0 moles olefin/mol $H_2SO_4$. Acid extracts prepared by absorption in 70–80% strength acid form less dialkyl sulfate than higher strength acids due to hydrolysis of the ester to alcohol or reaction to form either. When 75–80% acid has been used to countercurrently extract $C_4$-naphtha the extract saturation at the olefin clean-up stage is 0.1 to 0.4 mols olefin/mol acid and the ester concentration in the naphtha is about .15 to .35 gms. di-secondary butyl sulfate as $H_2SO_4/100$ cc. of spent naphtha. When the acid strength used for extraction was 83–88%, the spent naphtha contains about 0.1–.5 gms. ester as $H_2SO_4/100$ cc. naphtha. In order for the acid treated naphtha to be useful for blending in gasoline or vaporized for a gas fuel the limitation set on the ester content is about 0.15 gm. as $H_2SO_4/100$ cc.

The prior art utilizes distillation and hydrolytic methods for purifying the acid-treated hydrocarbon of the dialkyl esters and the lesser amounts of sulfonic acids. The methods utilizing distillation require vaporization of the hydrocarbon which is accompanied by decomposition to acid and resinous products. Enough water is formed to make the evolved $SO_2$ very corrosive and thereby damaging to the distillation equipment. The resinous material can only be disposed of to the heavier fuel products.

Hydrolysis of the esters requires rather large equipment because in such dilute concentrations they are only slowly hydrolyzed. The resulting acid solutions where water is used are very corrosive and require corrosion resistant equipment. The hydrolysis is also done under high pressures where temperatures exceed 100° C. Hydrolysis is known near the critical temperature and pressure of butane when water is used as the hydrolytic agent.

It has now been found that dialkyl sulfates, aliphatic sulfonic acids, etc. are removed from acid-treated hydrocarbons by catalytic decomposition preferably in the liquid phase in the presence of an activated carbon on a suitable support or carrier. The catalyst is composed of activated carbon deposited on a support such as silica gel, alumina, clay, pumice, Alundum, kieselguhr, etc. The catalyst may be best prepared in situ by passing the ester containing naphtha over the silica gel (or other supporting material) at 50°–125° C. and at pressures sufficient to hold the hydrocarbon in the liquid state. Temperatures in the range of 50° C. to 125° C., preferably about 70° C., and pressure of 60 to 350 p. s. i. g., preferably about 85–125 are employed. Active carbon is formed as one of the products of decomposition of the ester and sulfonic acid in the naphtha (e. g. di-secondary butyl sulfate in $C_4$ naphtha). When the sulfuric esters decompose one of the initial products of reaction is sulfuric acid, which itself is a strong oxidizing agent. The sulfuric acid may then act as an oxidizing agent toward the olefinic bodies formed to give complete oxidation to carbon and water. This carbon is active for promoting the decomposition of ester to olefinic bodies, the larger portion being recovered as polymers of the alkyl portion of the ester or sulfonic acid. One reason for the long life of the catalyst may be that the carbonizing side reaction continues to slowly deposit active material on the carrier. The rate of such deposition is only slightly less than the rate of inactivation as evidenced by the long life of the total catalyst.

The first of such cycles spends the silica gel rather rapidly with respect to its life as a gel. The catalyst, if desired, can be treated with steam at a temperature above 100° C. to further activate the deposited carbon. In this form the catalyst can be used repeatedly in a cycle of adsorption and steam regeneration steps. The desorption or regenerating step is carried out at a temperature above the boiling point of water at the regeneration pressure. It is necessary to avoid undue condensation of water on the catalyst since deposition of water changes the gel structure which results in breaking up the catalyst surface and inactivates the catalyst. Regeneration temperatures are always above 100° C.

The adsorption may be carried out in a fixed bed or by circulation of finely divided slurries of the catalyst. The pressure employed in the adsorption step is above atmospheric and high enough to keep the hydrocarbon in the liquid phase.

The principal products of the ester and sulfonic acid decomposition are hydrocarbons. These are polymers of the simpler alkyl portions of the ester or sulfonic acid molecules. The acid residue of the molecule is largely converted to $SO_2$. As in the decomposition of such compounds as dialkyl sulfates by thermal treatment, the products of reaction were known to contain some $H_2S$ and mercaptan indicating other states of oxidation. All of the materials of decomposition, except the hydrocarbon, were acid enough to be removed by neutralization with aqueous NaOH solutions.

The process of the invention is applicable to the treatment of naphthas recovered from a wide range of treated stocks. For example, hydrocarbon fractions in the boiling range of $C_4$ to $C_{10}$ and above may be treated with sulfuric acid of strength ranging from 65 to 100 wt. %, for the removal of olefinic materials therefrom and the hydrocarbon raffinate containing dissolved saponifiable sulfur compounds is then subjected to the process of this invention. The invention is particularly applicable to hydrocarbon distillates or spent naphthas recovered by the treatment of $C_4$ to $C_6$ hydrocarbon fractions with sulfuric acid.

The following example illustrates a specific application of this invention:

EXAMPLE I

Butane naphtha, recovered from a process in which a $C_4$-hydrocarbon fraction was extracted with 83% $H_2SO_4$, was passed through a bed of 200 mesh silica gel at 70° C. The 360 g. of gel initially used was contained in a 1″ jacketed, stainless steel pipe. The temperature of 70° C. was maintained by applying steam to the jacket. As the hot butane flowed from the absorber it was allowed to vaporize. The vapors were passed through a caustic solution to remove the $SO_2$ formed by the decomposition of the esters and sulfonic acids. By measuring the volume of gas and $SO_2$ in the scrubber solution a material balance could be calculated and compared with the quantity of these materials potentially in the feed hydrocarbon. As the silica gel became spent, liquid samples of effluent naphtha showed increasing amounts of ester present. As the concentration exceeded 0.015 grams $H_2SO_4$ equivalent/100 cc. naphtha, the adsorption was stopped and the catalyst regenerated.

The catalyst (carbon deposited on silica gel) was regenerated by passing steam through the catalyst bed, instead of hydrocarbon, at 115–120 p. s. i. g. Steam was held on the jacket at the same pressure to avoid condensation of water in the catalyst bed. The effluent steam was condensed to measure the acid content. As the acid and heavy polymeric hydrocarbon was washed from the catalyst bed, the steam was shut off and replaced with nitrogen. The nitrogen was used to sweep out the water vapors at 80° C. As the gas became moisture free the naphtha feed was started again for the adsorption step. These cycles were continued until an equivalent 5560 barrels per ton of carbonized gel had been treated. The catalyst had increased rather than diminished in activity when its use was discontinued.

The steam regeneration of the catalyst was continued until the condensate was free of any acidity and hydrocarbons. The catalyst inactivation probably takes place by strong adsorption of the heavy polymers of decomposition. The steam reactivation serves to remove the small quantities of heavy polymer, leaving the active carbon surface free for reaction with the esters and sulfonic acids. The acid recovered by the regeneration is largely $SO_2$ but some $H_2SO_4$ is also leached from the catalyst.

The following table summarizes the data obtained on adsorption of alkyl sulfates and sulfonic acids on carbonized Attapulgus clay and silica gel in additional experiments.

was of course steamed. The same comments apply to the silica gel runs.

The naphtha passed over the catalyst was recovered as a liquid (the vapor scrubbing was convenient for the laboratory experiment) which contains the major portion of the decomposition products. A small amount of olefin is usually formed which has the same boiling range as the naphtha treated. Most of the ester is decomposed to polymers of the olefin which may vary from the dimer to several of the higher polymers. Normally, most of the polymers boil in the gasoline range and need not be removed from the treated naphtha. The acidic products are largely $SO_2$ with small amounts of $H_2S$ and $H_2SO_4$ being present. These can all be removed readily by caustic scrubbing of the liquid naphtha.

Having described the invention in a manner such as it may be practiced by those skilled in the art,

What is claimed is:

1. A process for the removal of saponifiable sulfur compounds from sulfuric acid-treated hydrocarbon mixtures of relatively low molecular weight containing the same which comprises passing the hydrocarbon in the liquid phase in contact with activated carbon contained on a support at a pressure of from about 60 to 350 p. s. i. g., and at temperatures of about 50° to 125° C., whereby the saponifiable sulfur compounds are catalytically decomposed and recovering hydrocarbon free of saponifiable sulfur compounds.

2. A process according to claim 1 in which the catalyst comprises activated carbon deposited on silica gel.

3. A process according to claim 1 in which the catalyst is activated carbon deposited on clay.

4. A process according to claim 1 in which the hydrocarbon contains 4 to 10 carbon atoms per molecule.

*Removal of butyl sulfates from $C_4$-naphtha by carbonized catalysts*

|  | Attapulgus Clay | | | | Silica Gel | | |
|---|---|---|---|---|---|---|---|
|  | 1st Cycle | 2nd Cycle | 3rd Cycle | 4th Cycle | 1st Cycle | 2nd Cycle | 3rd Cycle |
| Absorption: | | | | | | | |
| Vol. Naphtha Treated, liters | 75.7 | 56.0 | 31.0 | 24.9 | 36 | 38.6 | 76 |
| Feed Rate, cc./min | 100 | 100 | 100 | 100 | 100 | 100 | 100 |
| Sulfate Conc. in Feed, gm. $H_2SO_4$/100 cc | .1098 | .1068 | .502 | .505 | .15 | .15 | .15 |
| Temperature, °C | 70 | 70 | 70 | 70 | 70 | 70 | 70 |
| Pressure on Absorber, p. s. i. g | 60 | 60 | 60 | 60 | 60 | 60 | 60 |
| Wt. Absorbent Used (gms.) | 298 | 301 | 203 | 197 | 360 | 175 | 147 |
| Product: | | | | | | | |
| Sulfate Conc. in Product* | .0107 | .0179 | 0 | .021 | .039 | .0179 | .00408 |
| Vol. Naphtha Recovered, liters | 75.7 | 56.0 | 31.0 | 24.9 | 36 | 38.6 | 76 |
| Wt. Percent Carbon on Absorbent at start | 0 | 4.49 | 3.67 | 5.51 | 0 | 2.5 | 3.72 |
| Regeneration: | | | | | | | |
| Steam Pressure, p. s. i. g | 120 | 120 | 120 | 120 | 120 | 120 | 120 |
| Steam Temp. Outlet, °C | 110 | 110 | 110 | 110 | 110 | 110 | 110 |
| $Bu_2SO_4$ as $H_2SO_4$ Absorbed by Titration of Condensate from Regen. (gms.) | 74.95 | 49.84 | 159.02 | 120.63 | 39.95 | 51.0 | 109.9 |
| Feed: | | | | | | | |
| Total $Bu_2SO_4$ as $H_2SO_4$ Feed, g | 83.1 | 59.8 | 155.5 | 125.8 | 54.0 | 57.9 | 114.0 |
| Percent $Bu_2SO_4$ Absorbed | 90.3 | 83.4 | 102.2 | 96.3 | 81.3 | 88.1 | 96.4 |
| Lbs. Gel Used | | | | | .793 | .386 | .324 |

*Just prior to catalyst steaming.

Data in the table demonstrate the effectiveness of the active carbon catalyst for the reduction of the sulfate content in the naphtha. For example, during the first cycle the sulfate content was reduced from .1098 to a figure much below 0.107. The sulfate contents of the product as given in the table are not the optimum reduction obtained but are the highest or constant sulfate content appearing at the time the run was halted and catalyst steamed for reactivation purposes. It should be borne in mind that attempts were being made to approach as closely as possible to sulfate content of 0.015 gm. per 100 cc. Some runs were halted when this figure was exceeded, others when a constant sulfate content appeared for a sufficient length of time even though the figure was not exceeded. Some runs were interrupted because of week-end shut down or other reasons. For example, the third run with Attapulgus clay was halted even though the sulfate content was completely removed from the naphtha. This was done because acid was accumulating in the product due to the high ester content of the original naptha. Before starting up again the catalyst in each case 5. A process according to claim 1 in which the hydrocarbon contains 4 to 6 carbon atoms per molecule.

6. A process for the treatment of a $C_4$-hydrocarbon mixture which comprises treating the mixture with sulfuric acid of 65–100 wt. % strength whereby olefinic components of the mixture are converted to saponifiable sulfur compounds, separating an acid layer containing the bulk of the saponifiable compounds, removing dissolved saponifiable sulfur compounds from the hydrocarbon layer by treating the same in the liquid phase at a pressure of 60 to 350 p. s. i. g. and a temperature of 50° to 125° C. with a catalyst consisting of activated carbon deposited on a support whereby the saponifiable compounds are catalytically decomposed and recovering a $C_4$-hydrocarbon stream free of saponifiable sulfur compounds.

7. A process for the treatment of a $C_4$ hydrocarbon mixture which comprises treating the mixture with sulfuric acid of 65 to 100 weight percent strength whereby olefinic components of the mixture are converted, at least in part, to saponifiable sulfur compounds, separating an acid layer containing the bulk of said saponifiable compounds, removing dissolved saponifiable sulfur compounds from the hydrocarbon layer by treating the same in the liquid phase at a pressure of from 60 to 350 p. s. i. g., and a temperature of from about 50° to about 125° C., with a catalyst consisting of activated carbon deposited on a support, whereby the saponifiable compounds are catalytically decomposed, said activated carbon being deposited on said support in situ by passage of the C₄ hydrocarbon layer over said support at a pressure of from about 60 to 350 p. s. i .g., and a temperature of from about 50° to 125° C., and recovering a C₄ hydrocarbon stream free of saponifiable sulfur compounds.

References Cited in the file of this patent

UNITED STATES PATENTS

| | | |
|---|---|---|
| 1,728,059 | Heisig | Sept. 10, 1929 |
| 2,279,461 | Hene | Apr. 14, 1942 |